July 9, 1968

S. E. MILLER 3,392,353

MASER INTRACAVITY PHASE MODULATOR

Filed June 11, 1964

INVENTOR
S. E. MILLER
BY
ATTORNEY

July 9, 1968   S. E. MILLER   3,392,353
MASER INTRACAVITY PHASE MODULATOR
Filed June 11, 1964   3 Sheets-Sheet 2

July 9, 1968  S. E. MILLER  3,392,353
MASER INTRACAVITY PHASE MODULATOR
Filed June 11, 1964  3 Sheets-Sheet 3

United States Patent Office 3,392,353
Patented July 9, 1968

3,392,353
MASER INTRACAVITY PHASE MODULATOR
Stewart E. Miller, Middletown, N.J., assignor to Bell Telephone Laboratories, Incorporated, New York, N.Y., a corporation of New York
Filed June 11, 1964, Ser. No. 374,326
9 Claims. (Cl. 332—7.51)

This invention relates to phase modulators and, in particular, to intracavity arrangements for phase modulating a maser beam.

Means for generating electromagnetic waves in the infrared, visible and ultraviolet frequency ranges, hereinafter to be referred to collectively as the optical range, have been disclosed in United States Patent 2,929,922 issued to A. L. Schawlow et al. and in the copending United States application of A. Javan, Ser. No. 277,651, filed May 2, 1963. (Also see the article by A. Yariv and J. P. Gordon, entitled, "The Laser," that was published in the January 1963 issue of the Proceedings of the Institute of Radio Engineers.) Wave energy generated in the manner explained by Schawlow et al. and by Javan is characterized by a high degree of monochromaticity and coherency. In addition, because of the very high frequency of wave energy in the optical portion of the frequency spectrum, such wave energy is capable of carrying enormous amounts of information and is, therefore, particularly useful as a transmission medium in a communication system. However, efficient utilization of this great potential is dependent upon the availability of means for modulating wave energy at these very high frequencies.

Various methods have been disclosed for amplitude modulating optical waves. However, because of amplitude nonlinearities in optical materials and amplifiers that might typically be used in an optical communications system, an amplitude modulated optical wave would tend to experience additional, spurious amplitude modulation as it propagates along the system. However, phase nonlinearities associated with optical materials and amplifiers are small and, hence, there would be no comparable problem with respect to the phase coherency of an optical signal propagating along the same system.

It is, accordingly, an object of this invention to phase modulate optical wave energy.

It is a more specific object of this invention to phase modulate optical wave energy within the cavity of an optical maser.

In accordance with the invention, phase modulation of an optical wave is produced by inducing two wave components whose direction of polarization is perpendicular to the direction of polarization of the optical wave energy existing within the maser cavity. The first of these components has a constant amplitude and is delayed ninety degrees in time phase with respect to the second induced component which is amplitude modulated at the modulating frequency. The output wave, comprising the two induced components is a phase modulated signal whose phase varies in accordance with the amplitude variations of the second wave component.

As the phase modulated signal produced in the manner described is polarized at right angles to the maser beam, polarization selective means are utilized to couple the phase modulated wave out of the maser cavity.

In a first embodiment to be described, the phase modulated signal is produced during the course of a single passage of the maser beam in one direction through the modulator. In an alternate embodiment of the invention, the modulator is adapted to add the phase modulated signals produced as a result of two passages through the modulator in opposite directions, thereby producing a phase modulated output signal of twice the amplitude.

These and other objects and advantages, the nature of the present invention, and its various features, will appear more fully upon consideration of the various illustrative embodiments now to be described in detail in connection with the accompanying drawings, in which:

FIG. 1 is a first embodiment of the invention including a phase modulator disposed within the maser cavity;

FIGS. 2 and 3, included for purposes of explanation, show the space-phase relationship and the time-phase relationships of the various wave components at different locations within the phase modulator;

FIG. 4, included for purposes of explanation, shows the two principal planes of a birefringent material and a linear polarized wave applied at 45 degrees to the principal planes;

Figure 7:
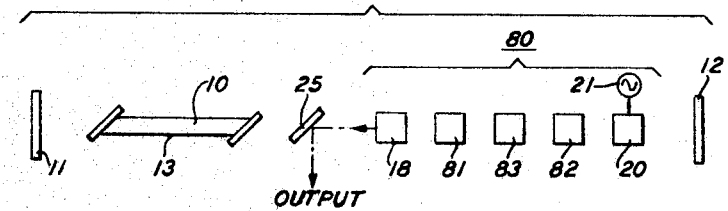
Figure 8:
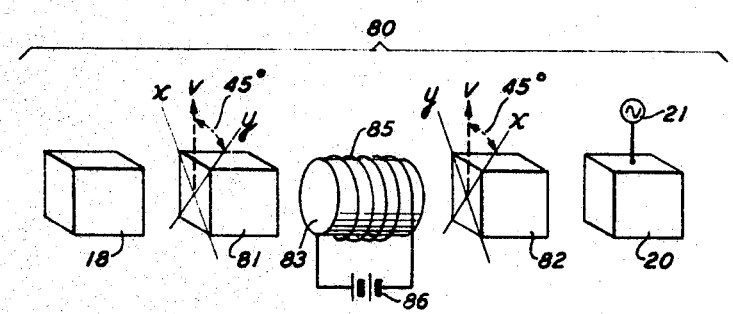
Figure 8:
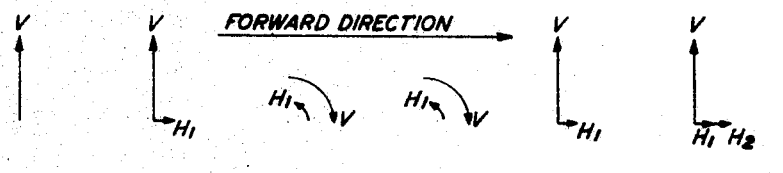
Figure 8:
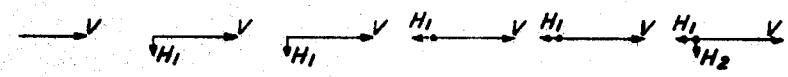
Figure 8:
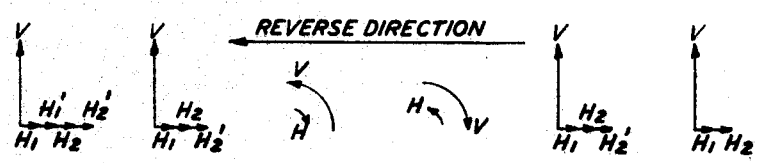
Figure 8:
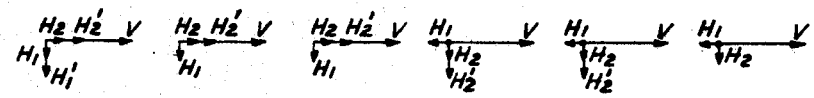

FIG. 7 is an alternate embodiment of the invention in which the maser beam is modulated as it traverses the modulator in two opposite directions for producing a single output of increased amplitude; and FIG. 8, included for purpose of explanation, shows the space-phase and time-phase relationships of the various signal components at different locations within the modulator and for opposite directions of propagation.

Figure 1:
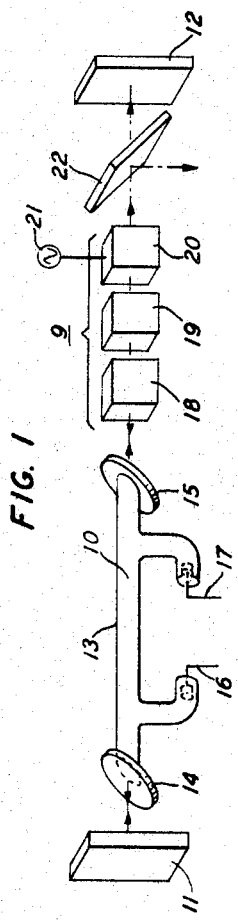

Referring to FIG. 1, there is shown an illustrative embodiment of the invention comprising an active maser medium 10 and a modulator 9 disposed within a cavity defined by the reflectors 11 and 12.

Because the invention is of particular interest at optical frequencies, it is described herein in connection with optical masers, or lasers. Thus, for purposes of illustration, the active medium may be a gaseous mixture of helium and neon enclosed in an elongated tube 13. However, it is to be understood that the principles of the invention are applicable at any frequency for which a maser can be constructed and are not limited to the optical frequency.

To minimize reflections and to polarize the maser beam, the ends 14 and 15 of tube 13 are inclined at the Brewster angle. A D.C. power source (not shown) is connected to electrodes 16 and 17 for supplying the power necessary to produce and maintain a gas discharge within tube 13. It is to be understood, however, that other means, well known in the art, can be employed for producing a population inversion in the active medium and that other materials can be used as the active medium.

The reflectors 11 and 12, which define the maser cavity, can have plane surfaces, curved surfaces, or a combination of one plane surface and one curved surface can be used. Normally, at least one of the reflectors is partially transmissive, so that wave energy can be coupled out of the cavity. However, in the present invention this is not necessary since the output is derived in another way, as will be described in greater detail hereinbelow. For a more detailed discussion of the laser see the article entitled "The Laser," by A. Yariv and J. P. Gordon referred to hereinabove.

Phase modulation of a portion of the cavity beam is accomplished by means of a phase modulator 9 comprising the three stages 18, 19 and 20 interposed along the beam path between the active medium 10 and one of the cavity reflectors 12. Before proceeding with a detailed discussion of the function of each of these stages, some general comments about phase modulation will be made.

Phase modulation is defined in The International Dictionary of Physics and Electronics as "Angle modulation in which the angle of a sine-wave carrier is caused to depart from the carrier angle by an amount proportional to the instantaneous value of the modulating wave." It is shown, on page 595 of "Electronic and Radio Engineering" by F. E. Terman, Fourth Edition, that a phase modulated wave can be considered as comprising two components of the same frequency, but delayed 90 degrees in time phase with respect to each other. The first of these components has a constant amplitude, whereas the other varies in amplitude in accordance with the modulating signal.

In accordance with the invention, the function of the stages designated 18, 19 and 20, is to produce two wave components whose amplitude and time-phase relation are such as to combine, in the manner described, to produce a phase modulated signal. More specifically, the first stage 18 is a polarization converter, whose purpose is to convert a portion of the maser beam, which is polarized in a first direction by means of the inclined ends 14 and 15 of tube 13, to a first wave component of constant amplitude, polarized perpedicular to the direction of polarization of the maser beam. For the purposes of discussion, hereinafter, the maser beam shall be considered as vertically polarized and the converted wave energy as horizontally polarized. The second stage 19 is a differential phase shifter, which introduces a 90 degree time-phase shift between the maser beam and the first induced wave component. The third stage 20 is a second polarization converter which converts a second portion of the vertically polarized maser beam to a second horizontally polarized wave component. The amplitude of the second component, however, is caused to vary in accordance with the modulating signal derived from a modulating source 21.

Because the two induced components are polarized perpendicular to the direction of the maser beam, they can be extracted selectively from the cavity by means of a polarization selective reflector 22 interposed along the beam path. This can be a Nicol prism of the type described on pages 500 to 502 of "Fundamentals of Optics," by F. A. Jenkins and H. E. White, or any other means known in the art.

The output wave then comprises the two horizontally polarized wave components, one of which is constant in amplitude and the other of which varies in amplitude in accordance with the modulating signal. In addition, the two components are 90 degrees out of time phase, thus constituting the equivalent of the two waves which are the equivalent of a phase modulated wave.

Figure 2:
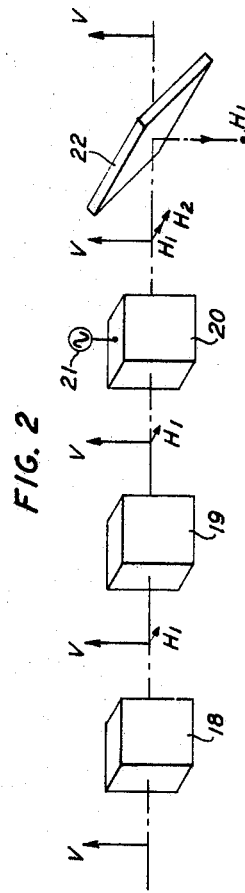
Figure 3:
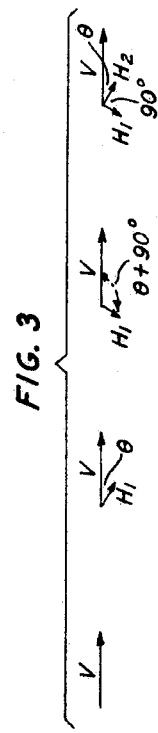

FIG. 2 and FIG. 3, included for purposes of explanation, show the space-phase relationships and the time-phase relationships, respectively, of the maser beam and the induced components as they propagate through the several stages 18, 19 and 20 of modulator 9. Assuming the maser beam is vertically polarized, the input wave to the first stage 18 in FIG. 2 is indicated by the vertical vector marked V. In the time diagram of FIG. 3, the input beam, also designated V, is the horizontally directed reference vector.

The output from stage 18 comprises the vertically polarized wave V and a smaller, horizontal component designated $H_1$. Thus, in the space diagram of FIG. 2, the component $H_1$ is oriented perpendicular to V. In the time diagram of FIG. 3, component $H_1$ is shown at some arbitrary phase angle $\theta$ with respect to V.

Components V and H, then enter the differential phase shifter 19, which changes their time phase relationship, but does not affect their space phase relationship.

Thus, while there is no change in the direction of polarization of these two components as they pass through stage 19, there is an additional 90 degree time-phase delay introduced. Accordingly, the time-phase angle between V and $H_1$ is increased to $\theta+90°$, as shown in FIG. 3.

The third stage 20 is another polarization converter whose output consists of the vertically polarized beam V, and two horizontal components. One component is the previously produced $H_1$ component which is substantially unaffected by the traversal of stage 20. The other is an additionally induced component, $H_2$, which is amplitude modulated in accordance with the signal derived from signal source 21. The two components $H_1$ and $H_2$ are spacially aligned, as both are horizontally polarized. In time, however, the $H_2$ component is out of phase with the vertical component by an amount $\theta$ and is in time quadrature with the $H_1$ component.

The output from the cavity, accordingly, is a phase modulated wave comprising the sum of a constant component $H_1$ and an amplitude modulated component $H_2$.

The above discussion has been directed to the general arrangement for phase modulating a portion of the cavity wave energy. In the discussion to follow, specific arrangements are considered for inducing the various wave components and adjusting their phases.

As is known, there are electro-optical materials which become birefringent when subjected to an electric field. By the term "birefringent," it is meant that the material exhibits a different index of refraction for light polarized in different directions. One such material is potassium dihydrogen phosphate ($KH_2PO_4$), more commonly referred to simply as KDP. Normally, KDP is optically uniaxial with the optic axis along the tetragonal Z axis. Light propagating parallel to the optic axis travels with the same velocity irrespective of the direction of polarization. However, upon the application of an electric field in the direction of the Z axis, the crystal symmetry is altered to ortho-rhombic and the crystal becomes biaxial. As a result, the index of refraction for light propagating along the Z direction is different for light polarized in different directions. In particular, there are two, mutually perpendicular directions, commonly referred to as the principal planes, for which the difference in refractive indicies is a maximum. The relative phase retardation, $\Gamma$, between waves propagating along the two principal planes (i.e., principal waves), over a distance L, is given by $$\Gamma = \frac{\pi E L}{K} \quad (1)$$

where

E is the electric field impressed across the crystal and K is the value of EL for half-wave retardation.

Figure 4:
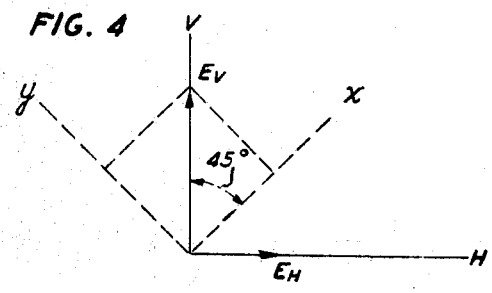

Referring to FIG. 4, if a vertically polarized applied wave, represented as $$E_v = E_o \sin \omega t \quad (2)$$

is incident upon a birefringent material so that its direction of polarization makes a 45 degree angle with the principle planes, $x$ and $y$, the wave can be resolved into two orthogonal principal waves $$E_x = 0.707 E_o \sin \omega t \quad (3)$$

and $$E_y = 0.707 E_o \cos \omega t \quad (4)$$

Due to the difference in refractive indicies, a relative phase difference, $\Gamma$, is produced between the $x$ and $y$ plane waves, such that at the output end of the material the principal waves are given by $$E_x = 0.707 E_o \sin \omega t \quad (5)$$

and $$E_y = 0.707 E_o \sin (\omega t + \Gamma) \quad (6)$$

In terms of the vertical and horizontal directions, the output is given by $$E_v = 0.707 E_x + 0.707 E_y \quad (7)$$

and $$E_H = 0.707 E_x - 0.707 E_y \quad (8)$$

Noting that $\sin (\omega t + \Gamma) = \cos \Gamma \sin \omega t + \sin \Gamma \cos \omega t$, Equations 7 and 8 can be rewritten as $$E_v = 0.5 E_o [(1 + \cos \Gamma) \sin \omega t + \sin \Gamma \cos \omega t] \quad (9)$$

and $$E_H = 0.5 E_o [(1 - \cos \Gamma) \sin \omega t - \sin \Gamma \cos \omega t] \quad (10)$$

In order not to unduly load the maser cavity, only a small amount of energy is converted from the vertical wave to the horizontal wave. (Typically, $E_H$ is about one-tenth of $E_v$.) This is controlled by making $\Gamma$ much less than one radian. With $\Gamma \ll 1$, $\cos \Gamma \approx 1$ and $\sin \Gamma = \Gamma$, and Equations 9 and 10 can be simplified to $$E_v \approx 0.5 E_0 (2 \sin \omega t) \qquad (11)$$

and $$E_H \approx 0.5 E_0 (-\Gamma \cos \omega t) \qquad (12)$$

Equations 11 and 12 show that under the specified conditions, the horizontal wave component produced by the polarization converter is 90 degrees out of time phase with the vertical wave component. This means that $\theta$, the time phase angle in FIG. 3, is 90 degrees.

Figure 5:
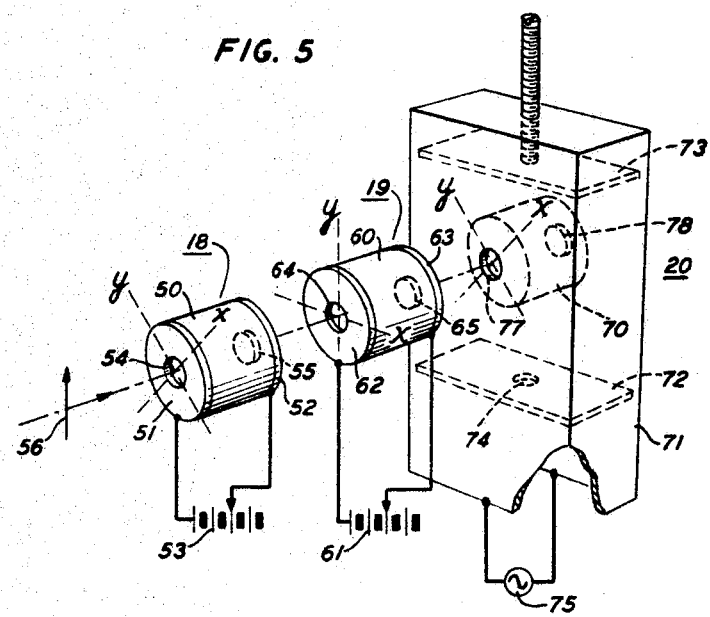
FIG. 5 is a specific illustrative embodiment of the modulator portion of FIG. 1.

Equation 12 also shows that the amplitude of the $E_H$ wave component varies proportionately with $\Gamma$. Thus, if the electric field applied to the birefringent crystal is amplitude modulated, thereby causing the relative retardation $\Gamma$ to vary proportionately in the manner provided by Equation 1, the amplitude of the $E_H$ wave component is similarly modulated in accordance with the modulating signal. Accordingly, an illustrative embodiment of a phase modulator, in accordance with the present invention, and as illustrated in FIG. 5, comprises three birefringent members. Using the same identification numerals as was used in FIGS. 1 and 2, the first stage 18 comprises a crystal 50, of birefringent material, across which there is impressed a constant electric field in a direction parallel to the direction of wave propagation through the crystal. The electric field is derived from an adjustable source of constant potential 53 which connects to a pair of conductive electrodes 51 and 52 located at each end of crystal 50. Electrodes 51 and 52 are provided with apertures 54 and 55, respectively, to permit passage of the maser beam. Since stage 18 is a polarization converter, the crystal is oriented such that the principal planes, $x$ and $y$, are inclined at an angle to the direction of polarization of the cavity beam, indicated by the arrow 56. Preferably, though not necessarily, the principal planes make an angle of 45 degrees with the direction of polarization of the maser beam.

The second stage 19, is in certain respects substantially the same as 18, comprising a birefringent crystal 60, and a source of constant potential 61 which is impressed longitudinally across crystal 60 by means of electrodes 62 and 63. The latter are similarly provided with apertures 64 and 65 to permit the maser beam to pass through the crystal.

However, as stage 19 is a differential phase shifter, crystal 60 is oriented with its principal planes parallel to the directions of polarization of the two wave components applied to it, thus producing a time phase shift without affecting the direction of polarization of the wave components.

Stage 20 is the second polarization converter in the system and is the converter to which modulation is applied. Accordingly, the form this unit takes depends upon the frequency of the modulating signal. For low frequency modulation, an arrangement similar to stage 18 can be used. In FIG. 5, however, stage 20 is adapted for modulation at microwave frequencies by locating the birefringent crystal 70 in a resonant cavity formed by a portion of rectangular waveguide 71 and the conductive terminations 72 and 73. Termination 72 is provided with a coupling aperture 74 for coupling wave energy supplied from a source 75 to the cavity. Termination 73 is shown as adjustable for tuning the cavity.

Access to crystal 70 by the maser beam is provided by means of apertures 77 and 78 located in the wide guide walls.

Since stage 20 is a polarization converter, the crystal is oriented with its principal planes at an angle, preferably 45 degrees, to the direction of polarization of the maser beam.

In the embodiment of FIG. 5, the biasing electric field is applied parallel to the direction of wave propagation through the birefringent material. However, it is understood that the direction of the biasing field depends upon the material that is used. Thus, if a cubic material such as gallium arsenide, zinc sulfide or cuprous chloride is used, the biasing field can be applied transverse to the direction of wave propagation. See, for example, United States Patent 2,788,710 for such alternate arrangements.

It should also be noted that the locations of stages 18 and 20 can be reversed. That is, the amplitude modulated H component can be induced first and the constant H component last, since the order in which these two components are induced is immaterial.

As explained herein, a portion of the maser beam is converted from a vertical polarization to a horizontal polarization as the maser beam passes through the phase modulator. As illustrated in FIG. 1, means 22 are provided to the right of the modulator section for removing from the maser cavity the horizontally polarized wave energy produced when the maser beam propagates in a direction from left to right. It is apparent, however, that an equal portion of the vertically polarized maser beam is similarly converted to horizontal polarization as the maser beam propagates through the modulator in the opposite direction, from right to left. In the absence of some means, located between the modulator 9 and active medium 10, for removing this horizontally polarized wave energy, it will propagate through the active medium, be reflected by reflector 11, and after a second passage through the active medium reenter the modulator. It can readily be shown, however, by an analysis similar to that given above, that the constant component $H_1$ produced by the modulator when the maser beam propagates therethrough in the left-to-right (or forward) direction, is out of phase with the constant component produced by the modulator when the maser beam propagates therethrough in the right-to-left (or reverse) direction. Thus, the steady state, horizontally polarized components in an output signal which include wave components generated by a forward propagating and a reverse propagating maser beam, would cancel, leaving an output signal which only includes amplitude modulated components and is not phase modulated.

There are a number of ways of avoiding this difficulty. The first is to rely upon the polarization selectivity of the tube ends 14 and 15, as is done in the embodiment of FIG. 1. As indicated above, the ends are inclined at the Brewster angle. In accordance with Brewster's law, the vertically polarized beam is polarized obliquely to the plane of the ends and is totally refracted, whereas the horizontally polarized component is polarized parallel to the ends and is partially refracted and partially reflected. Thus, each window reflects a portion of the horizontally polarized wave energy which is thereby directed out of the maser cavity. For example, glass with an index of refraction of 1.52 reflects about 15 percent of the horizontally polarized wave energy at each surface. In traversing tube 13 twice, 15 percent of the horizontally polarized wave is reflected out of the cavity from eight surfaces thereby leaving the energy within the cavity highly polarized in but one direction. The degree of polarization P of the transmitted light is given, more generally by $$P = \frac{m}{m + \left(\frac{2n}{1-n^2}\right)^2}$$

where $m$ is the number of plates ($2m$ surfaces) and $n$ their refractive index.

The equation shows that by increasing the refractive index $n$ of the Brewster ends, P approaches unity, indicating that substantially all of the horizontally polarized wave energy can be removed from the maser beam.

Figure 6:
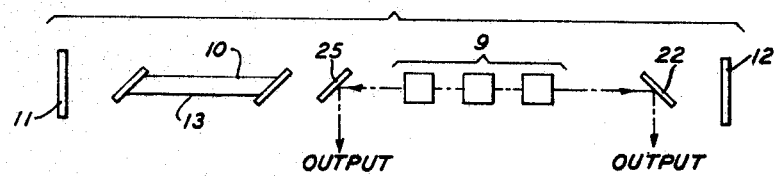
FIG. 6 is a modification of the embodiment of FIG. 1 for producing two output waves.

Alternatively, a second Nicol prism 25 can be placed between the tube 13 containing the active medium 10 and the modulator 9, as shown in FIG. 6. In this arrangement the horizontally polarized, phase modulated signal produced in traversing the modulator from left to right is coupled out of the cavity by prism 22, whereas the horizontally polarized, phase modulated signal produced in traversing the modulator from right to left is coupled out of the cavity by prism 25.

The advantage of using a second prism is that the energy in the second signal is not lost as it is when the Brewster windows 14 and 15 were relied upon to extract the second signal wave energy.

In FIG. 7, there is shown an alternate embodiment of the invention adapted for combining the phase modulated signals produced in the forward and reverse directions into a single output signal. Basically, the device is similar to the embodiment of FIG. 1, comprising an active medium 10 contained within tube 13 and located within the cavity defined by reflectors 11 and 12. Also located within the cavity is the phase modulator 80 and the polarization selective reflector 25. The latter, as shown in FIG. 7, is located between the modulator and tube 13.

The modulator 80 includes, as before, the polarization converters 18 and 20 for producing a first horizontally polarized wave component of constant amplitude, and a second horizontally polarized component of varying amplitude. However, the 90 degree differential phase shifter 19, of modulator 9, is replaced by a pair of linear-to-circular polarization converters 81 and 82 and a nonreciprocal phase shifter 83. FIG. 8 is a more detailed view of modulator 80, including the first linear-to-circular polarization converter 81, a Faraday effect nonreciprocal phase shifter 83 and the second circular-to-linear polarization converter 82. Also shown in FIG. 8 are the space and time-phase relationships among the various wave components for a forward and a reverse traveling wave.

Assuming, as before, that the maser beam is vertically polarized, the input to the first stage 18 of modulator is indicated by the vertical vector V in the space-phase diagram and the horizontal vector V in the time-space diagram. The output from stage 18 comprises the vertical component V and a horizontal component $H_1$, of constant amplitude. As was shown earlier, $H_1$ is also 90 degrees out of time-phase with V and is so designated. Polarization converter 82, which follows stage 18, is basically the same as the latter. It consists of a birefringent material oriented such that the principal planes, $x$ and $y$, are displaced 45 degrees with respect to the V and $H_1$ components. So oriented, the principal waves for each component are equal. In addition, the length of the material is selected so as to introduce a 90 degree time phase shift between the two principal waves for each component. The effect is to produce two circularly polarized waves at the output, one of which rotates in one direction and the other of which rotates in the opposite direction. In the illustration, the V component is shown rotating clockwise and the $H_1$ component counter-clockwise. In the time-phase diagram, however, they remain, for purposes of illustration, in time quadrature. Devices of this type are known in the art as "quarter-wave plates."

The nonreciprocal phase shifter 83, is the optical equivalent of a microwave Faraday effect device which exhibits a different velocity of propagation for oppositely rotating circularly polarized waves when subjected to a magnetic field. The magnetic field in FIG. 8 is supplied by a solenoid 85 and a power source 86, and is adjusted to introduce a 90 degree time differential between the V and $H_1$ components. Thus, the waves at the output of stage 83 are circularly polarized but have been shifted 90 degrees in time phase. In FIG. 8, this is indicated by an additional time delay which places $H_1$ 180 degrees out of time phase with V. As an example, the described phase shift can be produced using a one centimeter length of terbium aluminum garnet subjected to a 2000 oersted magnetic field.

The circular-to-linear polarization converter 82, following stage 83, is the same as converter 72 with the principal planes of the former rotated 90 degrees with respect to the latter. The output from this stage consists of the linearly polarized V and $H_1$ waves which, for purposes of explanation, remain in time-phase opposition.

Polarization converter 20 converts a second portion of vertically polarized wave energy into a horizontally polarized component $H_2$. The latter is amplitude modulated and is 90 degrees out of time and space phase with respect to the V component as explained hereinabove in connection with FIGS. 1 through 3. Thus, modulator 80 converts a portion of the maser beam into two orthogonally polarized components that are, in addition, 90 degrees out of time phase. However, in this embodiment, the components $H_1$ and $H_2$ are not removed from the maser cavity, but instead are permitted to be reflected by reflector 12 and to pass through the modulator 80 a second time in the reverse direction.

Referring again to FIG. 8, the reflected input to polarization converter 20 consists of the three components V, $H_1$ and $H_2$. The output from this stage includes the additionally induced component $H_2'$, which is in time phase with component $H_2$.

Upon passing through polarization converter 82, a circularly polarized V component and three, oppositely circularly, polarized H components are produced. As viewed along the direction of the magnetic biasing field applied to the phase shifter 83, the circularly polarized V component and H components are rotating oppositely to their directions of rotation in the forward propagating direction. As a result of the nonreciprocal nature of the phase shifter, the V component in the reverse wave is the slow wave, resulting in the H components being advanced in time-phase 90 degrees with respect to the V component. This brings components $H_2$ and $H_2'$ into time phase with V at the output of stage 83.

Polarization converter 81 converts the circularly polarized waves to linearly polarized waves which are then passed through stage 18. This stage adds a fourth horizontally polarized wave $H_1'$ in time-quadrature with V.

The horizontally polarized components $H_1$, $H_1'$, $H_2$ and $H_2'$ are removed from the cavity by means of reflector 25 and constitute the phase modulated output signal comprising the two in-phase, constant components $H_1$ and $H_1'$ and the two amplitude modulated components $H_2$ and $H_2'$. The latter are in-phase with respect to each other, but in time quadrature with respect to the constant components $H_1$ and $H_1'$.

In the explanation given above, spurious reciprocal phase shifts introduced by the various stages were neglected. These can be accounted for and corrected by adding, at a convenient place within the modulator between the first stage 18 and last stage 20, a reciprocal phase shifter (not shown) which introduces a phase shift of $180n+(180-\varphi)$ degrees, where $n$ is an integer including zero and $\varphi$ is the total spurious reciprocal phase shift introduced by the modulator stages. While this reciprocal phase shift alters the time-phase relationship between the V component and the H components, shown in FIG. 8, the essential time-phase relationships among the H components are maintained in the output.

As indicated earlier, the amplitude of the $H_1$ and $H_2$ components are kept small compared to the amplitude of the maser beam to prevent undue loading of the maser. Thus, the maximum amplitude depends upon the particular maser and its ability to tolerate loading. The minimum amplitude depends upon the ability of the rest of the system to sense and utilize small signals. This is a function of the inherent noise in the system. Theoretically, the modulator can operate down to zero amplitude. Typically, however, the amplitudes of $H_1$ and $H_2$ will fall within a range from 20 percent of V to one or two percent.

To minimize the amount of amplitude modulation on the phase modulated output signal, the amplitude modulated component $H_2$ is advantageously made equal to or less than $H_1$.

The individual stages described for producing the various signal components are understood to be merely illustrative and it is not intended that the invention be limited to these particular examples. Thus, in all cases it is to be understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A modulator comprising an active medium disposed within a cavity for the generation of a beam of electromagnetic wave energy.
   polarizing means within said cavity for polarizing said beam in a first direction;
   modulating means within said cavity for phase modulating a portion of the wave energy within said beam comprising:
      first polarization converting means for inducing a first wave component of constant amplitude polarized in a second direction perpendicular to said first direction;
      means for introducing a ninety degree time-phase shift between orthogonally directed wave components;
      second polarization converting means for inducing a second wave component of varying amplitude polarized in said second direction;
      and polarization selective means for extracting said first and second wave components from said cavity.

2. The combination according to claim 1 wherein said cavity comprises a pair of reflecting surfaces and wherein said polarization selective means is located between said second polarization converting means and one of said reflectors.

3. The combination according to claim 1 wherein said first polarization converting means comprises a birefringent material oriented with its principal planes at an angle to said first direction of polarization; wherein said phase shift means comprises a birefringent material oriented with one of its principal planes parallel to said first direction of polarization; and wherein said second polarization converting means comprises a birefringent material oriented with its principal planes at an angle to said first direction of polarization.

4. The combination according to claim 3 wherein said first polarization converting means and said phase shift means are electrically biased by means of constant electric fields, and wherein said second polarization converting means is electrically biased by means of a varying electric field.

5. The combination according to claim 1 wherein the amplitude of said first wave component and the maximum amplitude of said second wave component are less than ten percent of the amplitude of said beam.

6. In combination;
   a maser oscillator comprising an active medium disposed within a cavity defined by a pair of reflective surfaces; said cavity being supportive of a beam of electromagnetic wave energy;
   polarization means within said cavity for polarizing said beam in a first direction;
   modulating means located within said cavity between said active medium and one of said reflectors for phase modulating a portion of the wave energy within said beam comprising:
      a first polarization converter for inducing a wave component of constant amplitude polarized in a second direction perpendicular to said first direction;
      a linear-to-circular polarization converter for converting linearly polarized wave energy to circularly polarized wave energy;
      a ninety degree nonreciprocal phase shifter;
      a circular-to-linear polarization converter;
      a second polarization converter for inducing a wave component of varying amplitude polarized in said second direction;
      and polarization selective means located between said active medium and said modulator for extracting from said cavity said wave components polarized in said second direction.

7. The combination according to claim 6 wherein said linear-to-circular and said circular-to-linear polarization converters comprise birefringent materials oriented with their principal planes at forty-five degrees with respect to said directions of polarization and adapted to produce a ninety degree time-phase shift between wave components polarized in a direction parallel to said principal planes.

8. The combination according to claim 6 wherein said nonreciprocal phase shifter comprises a material exhibiting the Faraday effect and including means for applying a magnetic field to said material.

9. A modulator for phase modulating a portion of the wave energy in an optical beam polarized in a first direction comprising:
   means disposed along said beam for inducing a constant wave component polarized at right angles to said first direction;
   means disposed along said beam for inducing an amplitude modulated wave component polarized at right angles to said first direction;
   means for producing a ninety degree time-phase difference between said induced wave components;
   and polarization selective means for extracting said induced wave components from said optical beam.

References Cited

UNITED STATES PATENTS

| | | | |
|---|---|---|---|
| 3,239,671 | 3/1966 | Buhrer | 250—199 |
| 3,267,804 | 8/1966 | Dillion | 331—94.5 X |
| 3,272,988 | 9/1966 | Bloom et al. | 250—199 |

OTHER REFERENCES

Chang et al.: "Optical Faraday Rotation and Microwave Interactions in Paramagnetic Salts," Applied Optics, vol. 1, No. 3, May 1962, pp. 329–333, 332–7.51.

Buhrer et al.: "Electro-Optic Light Modulation With Cubic Crystals," Applied Optics, vol. 2, No. 8, August 1963, pp. 839–846.

ALFRED L. BRODY, *Primary Examiner.*